(12) United States Patent
Wicklund

(10) Patent No.: US 6,185,209 B1
(45) Date of Patent: Feb. 6, 2001

(54) VC MERGING FOR ATM SWITCH

(75) Inventor: Göran Wicklund, Nacka (SE)

(73) Assignee: Telefonaktiebolaget LM Ericsson, Stockholm (SE)

( * ) Notice: Under 35 U.S.C. 154(b), the term of this patent shall be extended for 0 days.

(21) Appl. No.: 08/893,391

(22) Filed: Jul. 11, 1997

(51) Int. Cl.[7] ................................................... H04L 12/56
(52) U.S. Cl. ............................................ 370/395; 370/417
(58) Field of Search .................................... 370/388, 390, 370/395, 417, 412, 474, 429, 413, 414, 418

(56) References Cited

U.S. PATENT DOCUMENTS

| | | |
|---|---|---|
| 5,285,445 | 2/1994 | Lehnert et al. . |
| 5,339,318 | 8/1994 | Tamaka et al. . |
| 5,367,520 | 11/1994 | Cordell . |
| 5,414,701 | 5/1995 | Shtayer et al. . |
| 5,418,781 * | 5/1995 | Kaufman et al. .................. 370/60 |
| 5,418,786 | 5/1995 | Loyer et al. . |
| 5,420,858 | 5/1995 | Marshall et al. . |
| 5,440,552 | 8/1995 | Sugita . |
| 5,455,825 | 10/1995 | Lauer et al. . |
| 5,467,349 | 11/1995 | Huey et al. . |
| 5,481,687 | 1/1996 | Goubert et al. . |
| 5,483,526 | 1/1996 | Ben-Num et al. . |
| 5,504,743 | 4/1996 | Drefenstedt . |
| 5,515,359 | 5/1996 | Zheng . |
| 5,521,917 | 5/1996 | Watanabe et al. . |
| 5,530,698 | 6/1996 | Kozaki et al. . |
| 5,530,806 | 6/1996 | Condon et al. . |
| 5,546,377 | 8/1996 | Ozveren . |
| 5,555,256 | 9/1996 | Calamvokis . |
| 5,572,522 * | 11/1996 | Calamvokis et al. ............ 370/60.1 |
| 5,577,035 * | 11/1996 | Hayter et al. ....................... 370/60 |
| 5,689,505 * | 11/1997 | Chiussi et al. ..................... 370/388 |
| 5,838,681 * | 11/1998 | Bonomi et al. .................... 370/395 |

FOREIGN PATENT DOCUMENTS

| | | |
|---|---|---|
| 0 531 599 A1 | 3/1993 | (EP) . |
| 0 676 878 A1 | 10/1995 | (EP) . |
| 2 301 913 | 12/1996 | (GB) . |

OTHER PUBLICATIONS

IBM Technical Disclosure Bulletin, vol. 35, No. 3, "Connectionless ATM Network Support Using Virtual Path Connections," pp. 445–448, Aug. 1992.

IBM Technical Disclosure Bulletin, vol. 38, , No. 1 "Combined Translation Lookaside Buffer for Page Frame Table and Translation Control Word Entries," pp. 240–242, Jan. 1993.

IBM Technical Disclosure Bulletin, vol. 38, No. 11 "Fast Technological Update in Asynchronous Transfer Mode Networks," pp. 359–360, Nov. 1995.

IBM Technical Disclosure Bulletin, vol. 39, No. 1, "Method for High–Speed Swapping of Asynchronous Transfer Mode Virtual Path Identifier/Virtual Channel Identifier Headers," pp. 225–228, Jan. 1996.

* cited by examiner

Primary Examiner—Chau Nguyen
Assistant Examiner—Alexander Boakye
(74) Attorney, Agent, or Firm—Nixon & Vanderhye P.C.

(57) ABSTRACT

An Asynchronous Transfer Mode (ATM) switching device (110) has a switch core (112) connected to a plurality of incoming VC channels and an egress port (116) connected to receive cells from the switch core. The egress port has both a plurality of pre-merge VC queues (144) and a plurality of merge VC queues (140). Cells received from the switch core are stored in one of the plurality of pre-merge VC queues in accordance with their incoming VC channel. A merge controller (132) determines when one of the pre-merge VC queues has a complete packet of cells, and enters the packet of cells into an appropriate one of the merge VC queues.

15 Claims, 7 Drawing Sheets

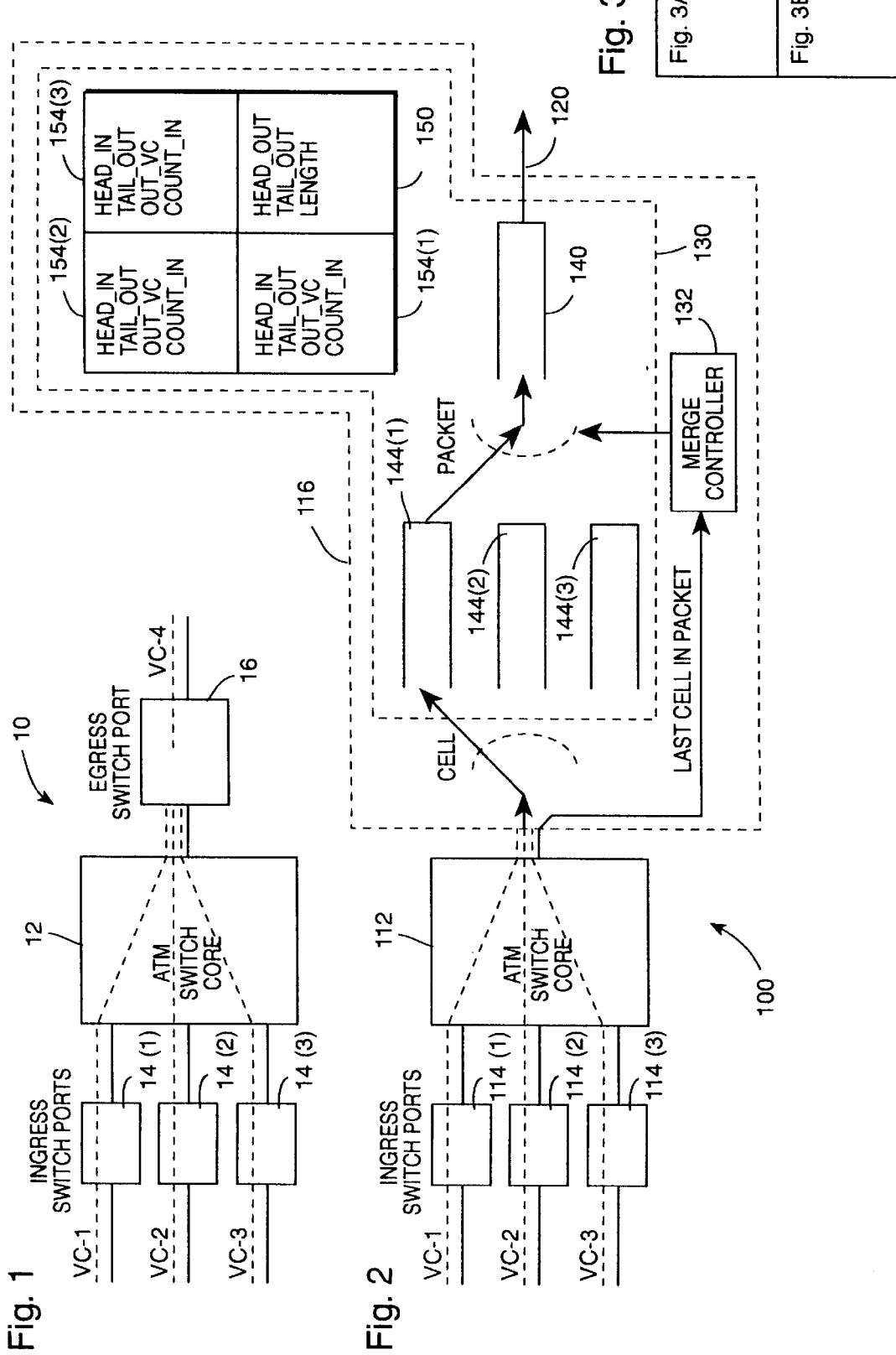

VC MERGING FOR ATM SWITCH

This application is related to the following (all of which are incorporated herein by reference): U.S. patent application Ser. No. 08/891,232, entitled "ABR SERVER", filed Jul. 11, 1997; U.S. patent application Ser. No. 08/890,758, entitled "HANDLING ATM MULTICAST CELLS", filed Jul. 11, 1997; U.S. patent application Ser. No. 08/893,576, entitled "A DATA SHAPER FOR ATM TRAFFIC", filed Jul. 11, 1997; U.S. patent application Ser. No. 08/893,479, entitled "VP/VC LOOK-UP FUNCTION", filed Jul. 11, 1997.

BACKGROUND

1. Field of Invention

This invention pertains to telecommunications, and particularly to the handling of cells in a switching node of a telecommunications network operating in the asynchronous transfer mode.

2. Related Art and Other Considerations

The increasing interest for high band services such as multimedia applications, video on demand, video telephone, and teleconferencing has motivated development of the Broadband Integrated Service Digital Network (B-ISDN). B-ISDN is based on a technology know as Asynchronous Transfer Mode (ATM), and offers considerable extension of telecommunications capabilities.

ATM is a packet-oriented transfer mode which uses asynchronous time division multiplexing techniques. Packets are called cells and have a fixed size. An ATM cell consists of 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual is a principal path defined between two switching nodes of the network; the virtual channel is one specific connection on the respective principal path.

At its termination points, an ATM network is connected to terminal equipment, e.g., ATM network users. Between ATM network termination points are a plurality of switching nodes having ports which are connected together by physical transmission paths or links. In traveling from an origin terminal equipment to a destination terminal equipment, ATM cells forming a message may travel through several switching nodes.

A switching node has a plurality of ports, each of which is connected by via a link circuit and a link to another node. The link circuit performs packaging of the cells according to the particular protocol in use on the link. A cell incoming to a switching node may enter the switching node at a first port and exit from a second port via a link circuit onto a link connected to another node. Each link can carry cells for a plurality of connections, a connection being a transmission between a calling subscriber or party and a called subscriber or party.

The switching nodes each typically have several functional parts, a primary of which is a switch core. The switch core essentially functions like a cross-connect between ports of the switch. Paths internal to the switch core are selectively controlled so that particular ports of the switch are connected together to allow a message ultimately to travel from an ingress side of the switch to an egress side of the switch, and ultimately from the originating terminal equipment to the destination terminal equipment.

FIG. 1 shows a prior art ATM switching device 10 having a switch core 12, a plurality of ingress ports 14 (1)–14 (3), and a exemplary egress port 16. FIG. 1 shows, in broken lines, cells incoming to switch 10 on three channels, particularly a first channel VC-1 to port 14 (1), a second channel VC-2 to port 14 (2), and a third channel VC-3 to port VC-3. All cells on the same channel have the same VC or VCI, e.g., cells on the first channel all have a first VC denominated as VC-1.

In the illustration of FIG. 1, the incoming cells on all channels VC-1 through VC-3 happen to be switched through switch core 12 to the same egress port 16 for eventual output to channel VC-4. At egress port 16 the cells are all assigned a new VPI/VCI code. The switching of several incoming VC channels to a same outgoing VC channel is referred to as "VC merging". The purpose of VC merging is to collect packets that shall be routed to the same destination into one single virtual channel, instead of using a separate VC between each source and the destination. This reduces the number of required virtual channels in the ATM network.

If the cells were all sent out in the order in which they arrived at the switch core 12, there would be no way of separating them at the end-point of channel VC-4. For this reason, VC merging can only work for channels carrying AAL-5 packets by storing complete packets at the egress port and sending them out packet-by-packet, i.e., the multiplexing is performed at the packet level.

What is needed, therefore, and an object of the present invention, is method and apparatus for efficiently conducting a VC merging operation.

SUMMARY

An Asynchronous Transfer Mode (ATM) switching device has a switch core connected to a plurality of incoming VC channels and an egress port connected to receive cells from the switch core. The egress port has both a plurality of pre-merge VC queues and a plurality of merge VC queues. Cells received from the switch core are stored in one of the plurality of pre-merge VC queues in accordance with their incoming VC channel. A merge controller determines when one of the pre-merge VC queues has a complete packet of cells, and enters the packet of cells into an appropriate one the merge VC queues.

In one embodiment, the plurality of pre-merge VC queues and the merge VC queues are each stored as separate linked lists in a common memory. The merge controller enters the completed packet of cells into the appropriate merge VC queue by linking the pre-merge linked list storing the packet to the linked list which forms the merge VC queue.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a schematic view of a prior art ATM switching device.

FIG. 2 is a schematic view of a ATM switching device according to an embodiment of the present invention.

FIG. 3 is a schematic diagram showing the relationship of FIG. 3A and FIG. 3B.

DETAILED DESCRIPTION OF THE DRAWINGS

Figure 3A:
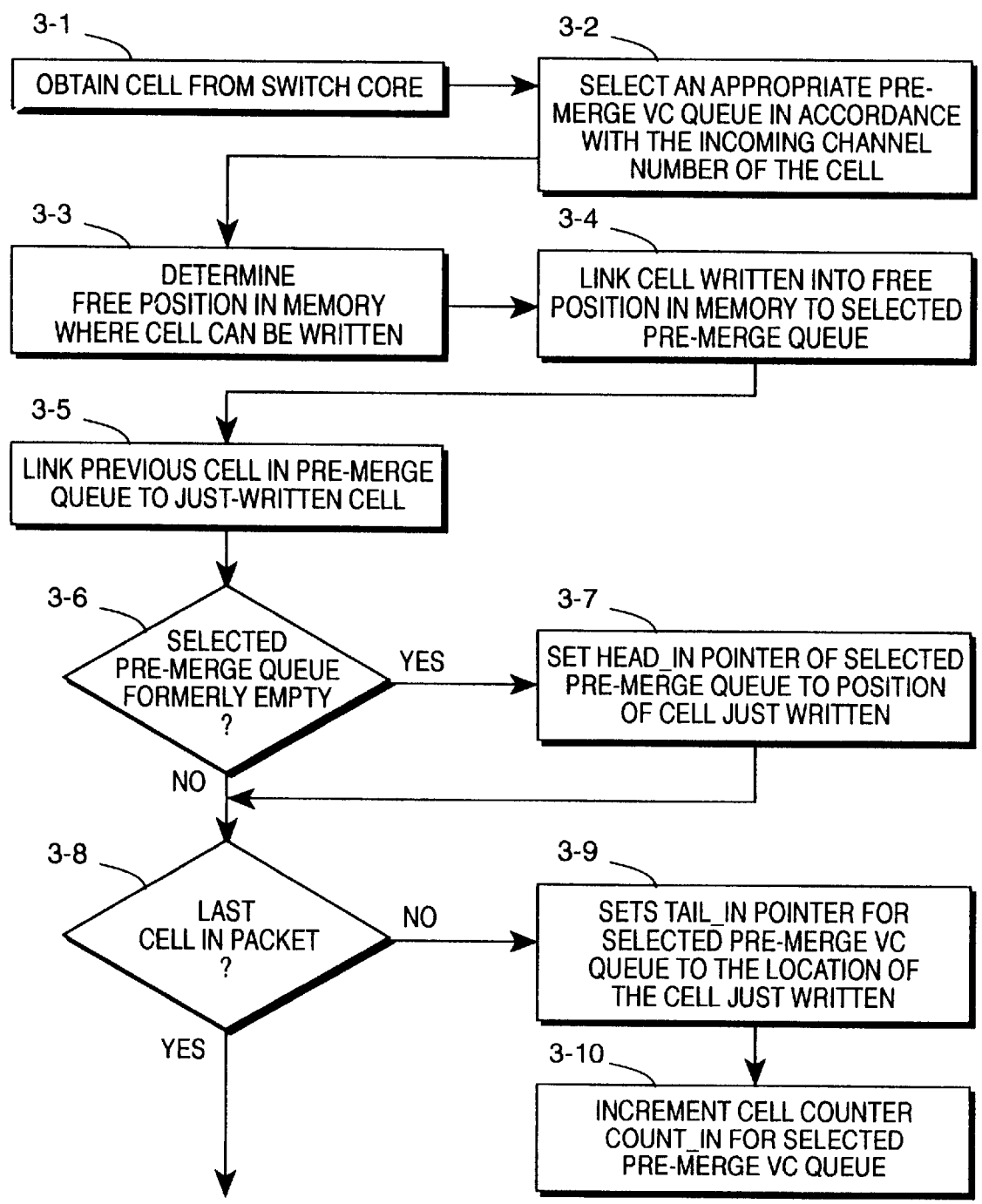
FIG. 3A and FIG. 3B are flowcharts showing operations performed in an egress port of the ATM switching device of FIG. 2 with respect to a pre-merge queue.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

FIG. 2 is a schematic view of ATM switching device 100 according to an embodiment of the present invention, also simply referred to as the ATM switch. ATM switch has a switch core 112 to which are connected a plurality of ingress ports 114 (1)–114 (3) and egress port 116. For sake of simplification of illustration, only three ingress ports 114 and one egress port 116 are depicted, it being understood that in actuality there are many ingress ports and many egress ports.

In like manner with FIG. 1, FIG. 2 shows, in broken lines, cells incoming to switch 100 on three channels, particularly a first channel VC-1 to port 114 (1), a second channel VC-2 to port 114 (2), and a third channel VC-3 to port VC-3. All cells on the same channel have the same VC or VCI, e.g., cells or. the first channel all have a first VC denominated as VC-1.

Switch core 112 routes cells to many egress ports, of which egress port 116 is shown as one example. Egress port 116 is connected to an outgoing link 120 through an unillustrated link interface circuit. In the particular embodiment shown in FIG. 2, egress port 116 comprises a memory 130 and a merge controller 132. Memory 130 can be any suitable storage means, such as a random access memory (RAM). In the example of FIG. 2, merge controller 132 is a microprocessor.

Memory 130 of egress port 116 includes a plurality of VC merge queues and a plurality of pre-merge VC queues. For sake of simplicity, only one VC merge queue 140 and three pre-merge VC queues 144 (1) through 144 (3) are illustrated. Each pre-merge VC queue 144 corresponds to a paired one of the incoming VC channels. As a cell is received by egress port 116 from switch core 112, merge controller 132 directs the cell to one of the pre-merge VC queues 144 (1) through 144 (3) in accordance with the incoming VC of the cell. For example, cells received on channel VC-1 are directed by merge controller 132 to pre-merge VC queue 144 (1); cells received on channel VC-2 are directed by merge controller 132 to pre-merge VC queue 144 (2); and so forth.

Merge controller 132 knows the incoming VC channel of a cell output to egress port 116 from switch core 112. Each cell carries a channel identifier, e.g., 16 bits that are prepended to the actual ATM cell. In this regard, the ingress port prepends each cell with routing information (e.g., to which egress port the cell shall be switched in the switch core) and the channel identifier which is used by the egress port to identify the cell. The channel identifier is derived from the VPI and VCI field of the incoming cell.

Cells are collected in their respective pre-merge queues 144 until merge controller 132 determines that an entire packet has been assembled in the pre-merge queue 144. When a completed packet has been assembled in a pre-merge queue 144, that completed packet is moved into the merge VC queue 140.

As demonstrated hereinafter with respect to FIGS. 5A–5F, the merge VC queue 140 is a linked list in memory 130 and the plurality of pre-merge VC queues are each separate linked lists in memory 130. Merge controller 132 enters a completed packet of cells in a selected one of the pre-merge VC queues 144 into merge VC queue 140 by linking the linked list of the selected one of the pre-merge VC queues 144 to the linked list which forms the VC queue 140.

Each pre-merge VC queue 144 and VC queue 140 have a set of control words associated therewith. These control words are also stored in memory 130, as indicated in FIG. 2. For example, merge VC queue 140 has set 150 of control words and pre-merge VC queues 144 (1)–144 (3) have corresponding sets 154 (1)–154 (3) of control words. The control words included in set 154 for each pre-merge VC queue 144 are explained by Table 1. The control words included in set 150 for merge VC queue 140 are explained by Table 2.

TABLE 1

| CONTROL WORDS FOR PRE-MERGE VC QUEUES | |
|---|---|
| Control Word | Explanation |
| Head_in | a pointer to the first cell in the pre-merge VC queue |
| Tail_in | a pointer to the last cell in the pre-merge VC queue |
| Out_VC | a pointer to the appropriate Merge VC queue |
| Count_in | a number of cells currently stored in the pre-merge VC queue |

TABLE 2

| CONTROL WORDS FOR MERGE VC QUEUE | |
|---|---|
| Control Word | Explanation |
| Head_out | a pointer to the first cell in the merge VC queue |
| Tail_out | a pointer to the last cell in the merge VC queue |
| Length | the current length of the merge VC queue |

Each cell in the pre-merge queues 144 and in the merge VC queue 140 has a pointer "Next" associated therewith. The pointer "Next" is or points to an address of the next cell which follows the cell in the corresponding queue.

In the above regard, FIG. 5A–FIG. 5F show contents, at differing times, of a portion of memory 130 in accordance with an example scenario of operation of the present invention. In each of FIG. 5A–FIG. 5F, memory 130 is shown as segmented into cell storage locations, such as a first storage location L0, a second storage location L1, and so forth. Each storage location is depicted as having, in its lower right hand corner, the associated "Next" pointer. Reference letter N is employed in FIG. 5A to indicate the "Next" pointer for the cell C1 stored at location L2. The "Next" pointer for cell C1 shows that cell C1 is followed in the linked list by the cell having location L4, i.e., cell C2.

Figure 3B:
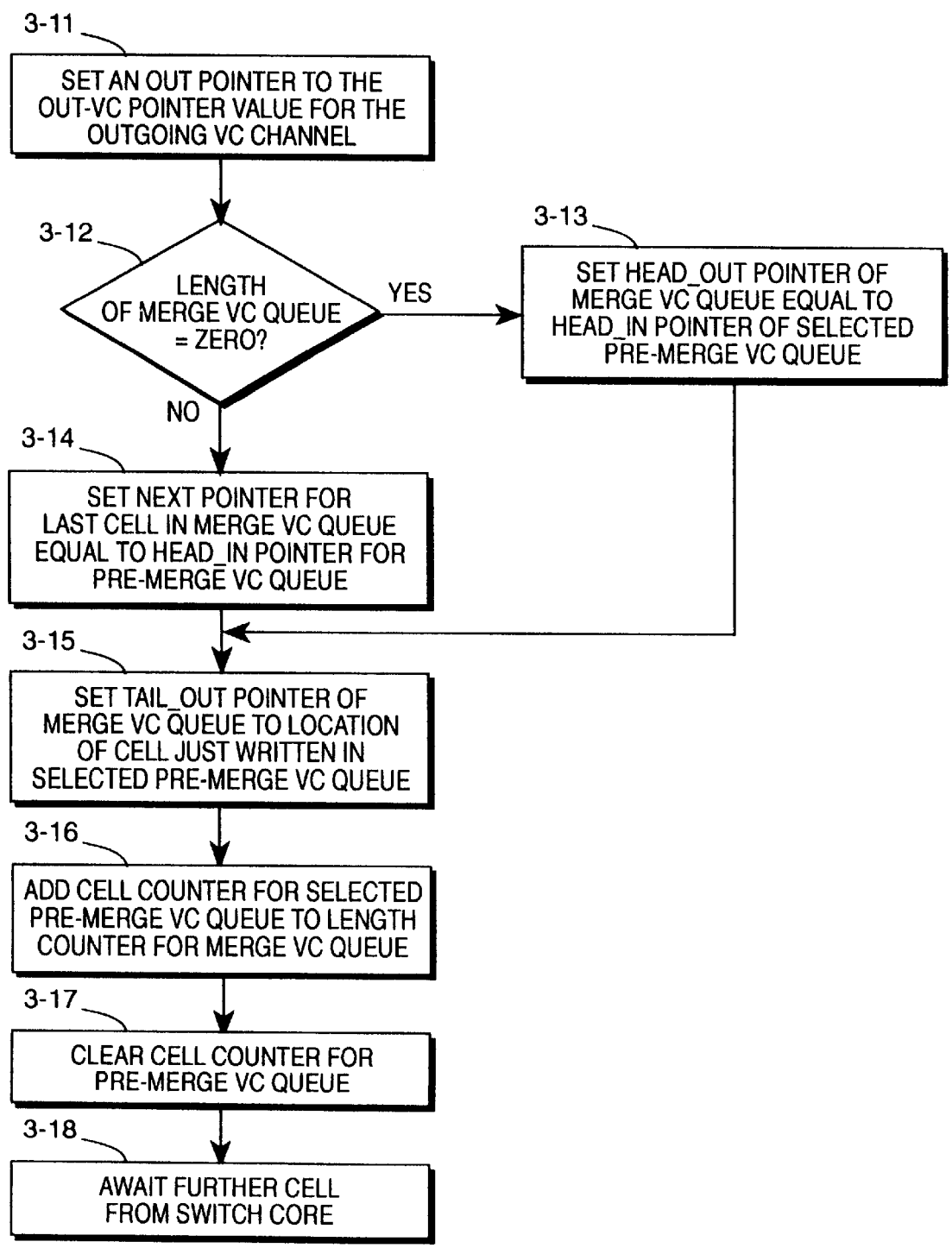

FIG. 3A and FIG. 3B depict basic steps performed by egress port 116 in accordance with the present invention. Step 3-1 shows egress port 116 obtaining a cell from switch core 112. When a cell is obtained from switch core 112, the cell also contains an indication of its incoming channel number (e.g., whether VC-1, VC-2, etc) and whether the cell is the last cell of a packet. Based on the incoming channel number, at step 3-2 merge controller 132 selects an appropriate pre-merge VC queue 144.

With an appropriate one of the pre-merge VC queues 144 having been selected at step 3-2, at step 3-3 a free location in memory 130 where the cell can be written is determined. Memory 130 is common to all queues, and all unused positions are linked into an idle queue. When a cell arrives, it is placed in the first buffer in this idle queue, and then linked into the right pre-merge VC queue (and linked out from the idle queue).

At step 3-4 the cell just written into the free location in memory 130 is linked to the selected pre-merge queue 144. At step 3-5 the location of the just-written cell is indicated by the Tail_in pointer.

At step 3-6 merge controller 132 determines whether the selected pre-merge VC queue 144 was formerly empty (i.e., empty for writing of the just-written cell). This is done by reading the Count in value. If the determination at step 3-6 is affirmative, at step 3-7 merge controller 132 sets the Head_in pointer (see the control words of sets 154 in FIG. 2) of the selected pre-merge queue 144 to the position (e.g. location) of the cell just written. Thus, step 3-7 essentially sets the beginning of the selected pre-merge VC queue at the location occupied by the just-written cell.

When the selected pre-merge VC queue 144 was not previously empty (indicated by counter value=0), at step 3-8 merge controller 132 determines whether the just-written cell is the last cell in a packet. The last cell of each packet has its PTI-field coded to 001 or 011. The PI field is bits 2–4 in the fourth octet of the ATM cell header bits number 1–8, bit 8 being transmitted first).

If the just-written cell does not complete a packet, steps 3-9 and 3-10 are executed before merge controller 132 awaits receipt of another cell at step 3-1. At step 3-9, merge controller 132 sets the Tail_in pointer for the selected pre-merge VC queue to the location of the cell just written. At step 3-10, the cell counter Count_in for the selected pre-merge VC queue is incremented to take into consideration inclusion of the just-written cell.

The steps of FIG. 3B are executed when merge controller 132 has determined that a packet has been completely assembled in the selected pre-merge VC queue 144. At step 3-11, for the selected pre-merge VC queue 144 the merge controller 132 uses the Out-VC pointer value to determine to which of the plurality of VC merge queues the new packet should be linked. In this regard, while only one VC merge queue 140 has been shown, in actuality there are many such VC merge queues. The value of the Out_VC pointer for a particular pre-merge VC queue determines to which of the plurality of VC merge queues the packets are destined.

At step 3-12 merge controller 132 determines whether the length of the merge VC queue 140 is zero. This determination is accomplished by checking the value of control word Length in set 150 (see FIG. 2). If the determination of step 3-12 is affirmative, at step 3-13 merge controller 132 sets the Head_out pointer of merge VC queue 140 equal to the Head_in pointer of the selected pre-merge VC queue 144.

Assuming merge VC queue 140 is not empty, at step 3-14 merge controller 132 sets the "Next" pointer for the cell which is currently the last cell in merge VC queue 140 equal to the value of the Head_in pointer for pre-merge VC queue 144. The currently last cell is found by reading the value of the Tail-out pointer. Step 3-14 effectively links the completed packet in the pre-merge VC queue to merge VC queue, by having the "Next" pointer of what was formerly the last cell in merge VC queue 140 set to point to the first cell of the completed packet in the selected pre-merge VC queue 144.

Upon completion of either step 3-14 or step 3-13, at step 3-15 merge controller 132 sets the Tail_out pointer of merge VC queue 140 to the location of the cell just written in the selected pre-merge VC queue 144. Step 3-15 effectively indicates that the end of merge VC queue 140 is now at the end of the selected pre-merge VC queue 144.

At step 3-16 merge controller 132 adds the cell counter (Count_in) for the selected pre-merge VC queue 144 to the length counter (Length) for merge VC queue 140, thereby updating the length counter (Length) for merge VC queue 140. Then, at step 3-17, merge controller 132 clears the cell counter (Count-In) for the selected pre-merge VC queue 144, since reading out of the completed packet from the selected pre-merge VC queue 144 empties the selected pre-merge VC queue 144. With the completed packet thus having been merged into merge VC queue 140, at step 3-18 merge controller 132 then awaits a further cell from switch core 112.

As appropriate, the steps of FIG. 3A and/or FIG. 3B are performed by merge controller 132 for each cell obtained from switch core 112. Which pre-merge VC queue 144 is the "selected" pre-merge VC queue 144 for any particular cell for which the steps of FIG. 3A and FIG. 3B are executed depends, as explained previously, on the incoming VC channel for the cell.

FIG. 4A–FIG. 4F illustrate an example scenario of operation of ATM switch 110 of the present invention in accordance with the steps of FIG. 3A and FIG. 3B as above described. FIG. 4A–FIG. 4F, showing portions of egress port 116, are correlated with FIG. 5A–FIG. 5F, respectively, which show portions of memory 130 of egress port 116. At a first time shown in FIG. 4A and FIG. 5A, merge VC queue 140 has cells C1 and C2 stored therein, and pre-merge VC queues 144 (2) and 144 (3) have cells C3 and C4, respectively, stored therein. As mentioned previously, the "Next" pointer N of cell C1 points to the location of cell C2, i.e., location L4, by which merge VC queue 140 is formed by a linking of cell C2 to cell C1.

Figure 4A:
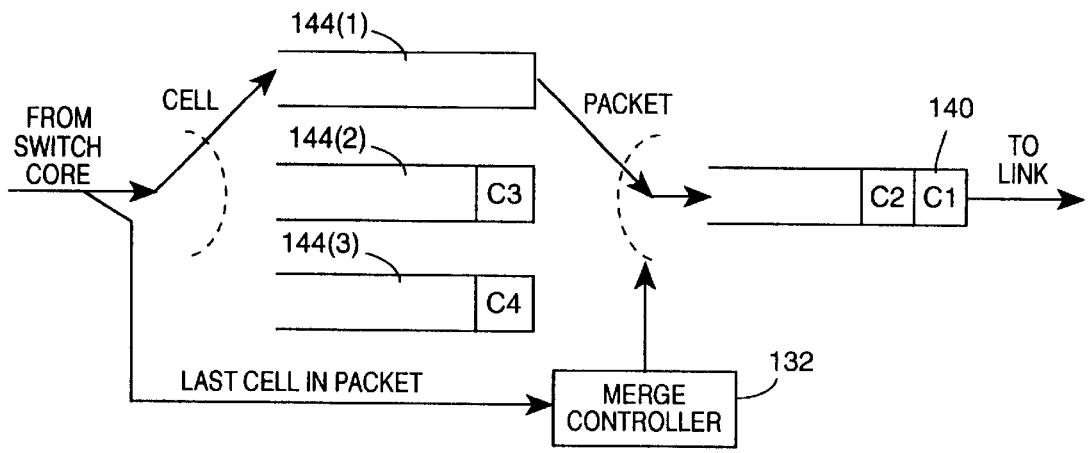
FIG. 4A–FIG. 4F are schematic views of the egress port of the ATM switching device of FIG. 2 showing cell population of a post-merge queue and pre-merge queues in accordance with an exemplary scenario.
Figure 4B:
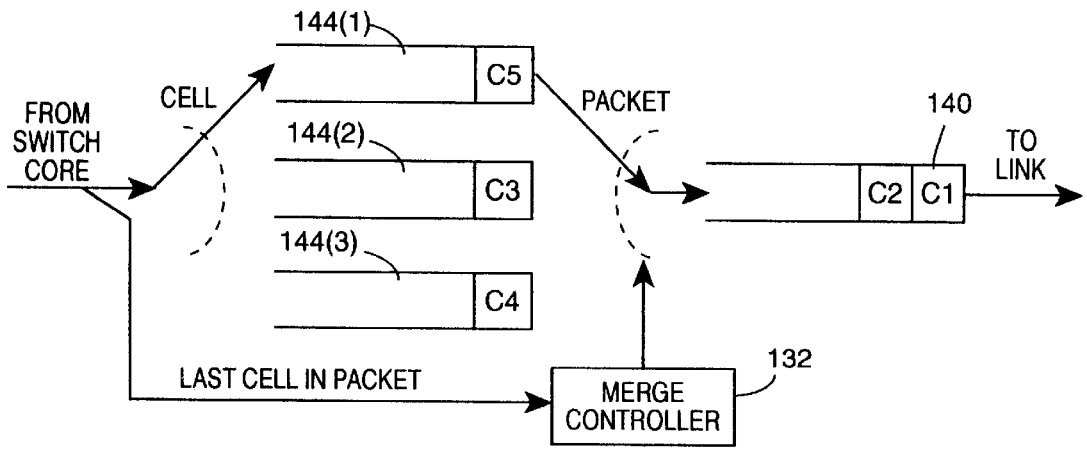
Figure 5A:
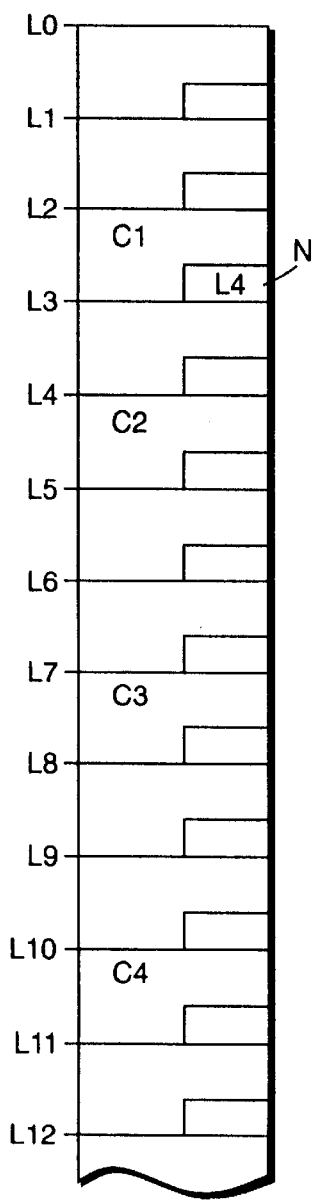
FIG. 5A–FIG. 5F are schematic views of a memory of the egress port of the ATM switching device of FIG. 2 showing cell population in accordance with the exemplary scenario depicted by corresponding FIG. 4A–FIG. 4F.
Figure 5B:
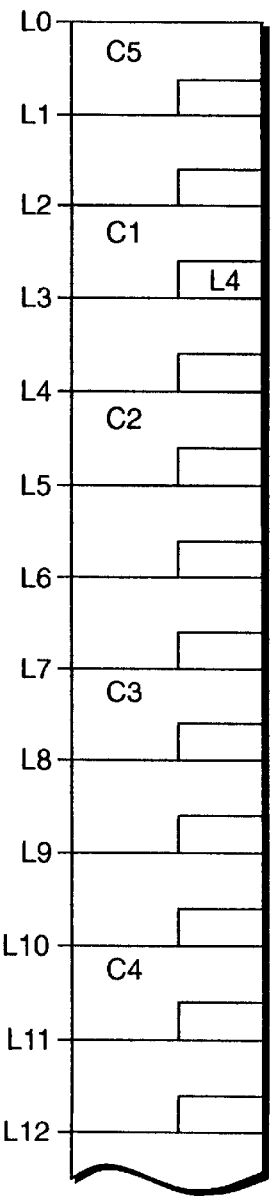

FIG. 4B and FIG. 5B show cell C5 entering from switch core 112 and, in view of its incoming VC, being stored in pre-merge VC queue 144 (1). It just so happens that the free list pointer in memory 130 points to location L0, with the result that cell C5 is stored in location L0 of memory 130.

Figure 4C:
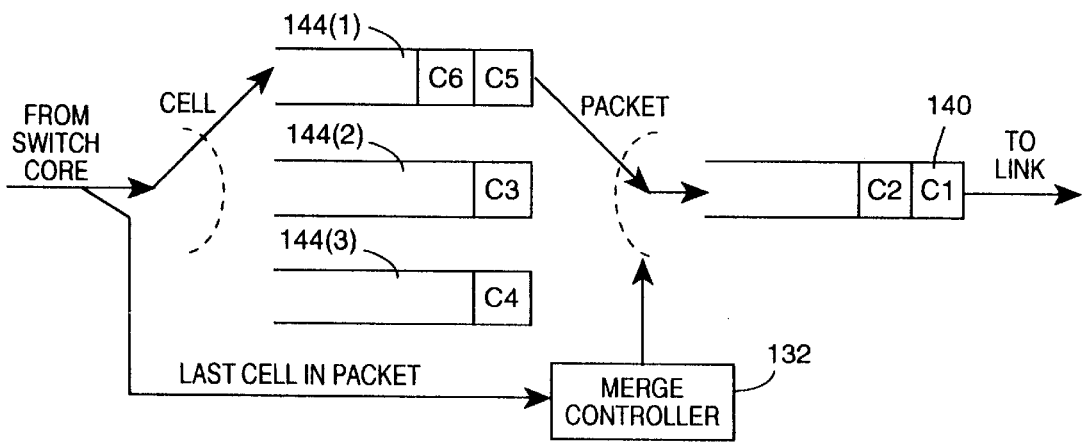
Figure 5C:
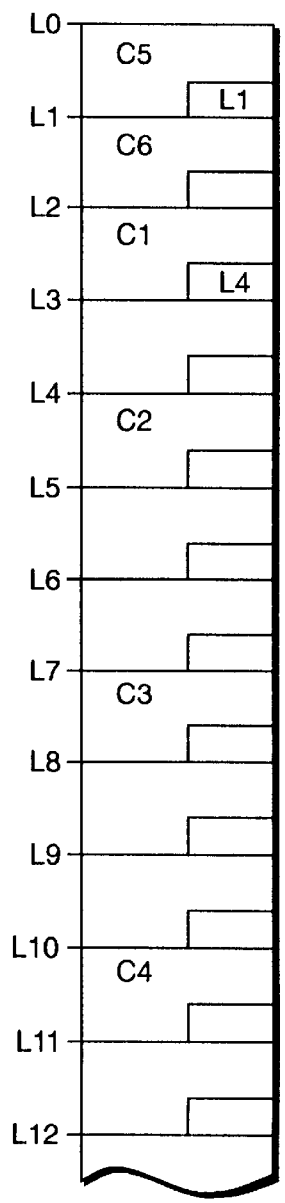

FIG. 4C and FIG. 5C show reception and storage in pre-merge VC queue 144 (1) of a further cell C6. Cell C6 is stored in a next free location in memory 130, i.e., location L1. So that cell C6 is linked into pre-merge VC queue 144 (1), in accordance with step 3-5 of FIG. 3A the "Next" pointer for cell C5 is loaded with the location of cell C6, i.e., location L1.

Figure 4D:
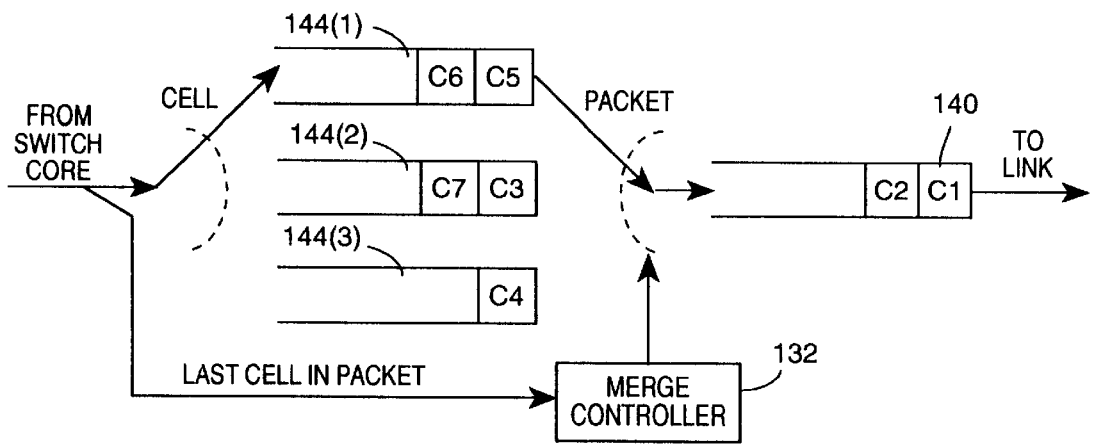
Figure 5D:
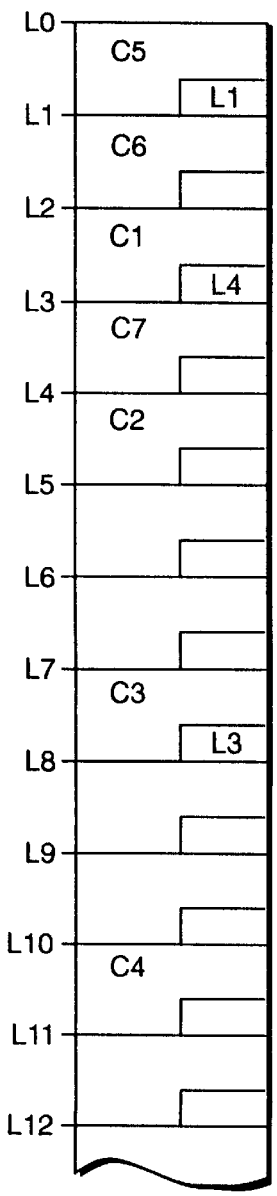

FIG. 4D and FIG. 5D show reception and storage in pre-merge VC queue 144 (2) of a further cell C7. Cell C7 is stored in a free location in memory 130, i.e., location L3, the free location being determined in accordance with the idle list. Cell C7 was stored in pre-merge VC queue 144 (2) since it had an incoming VC corresponding to VC channel VC-2. Thus, it is seen that cells received from switch core 112 are not necessarily all consecutively stored in the same pre-merge VC queue 144. So that cell C7 is linked into pre-merge VC queue 144 (2), the "Next" pointer for cell C3 is loaded with the location of cell C7, i.e., location L3.

Figure 4E:
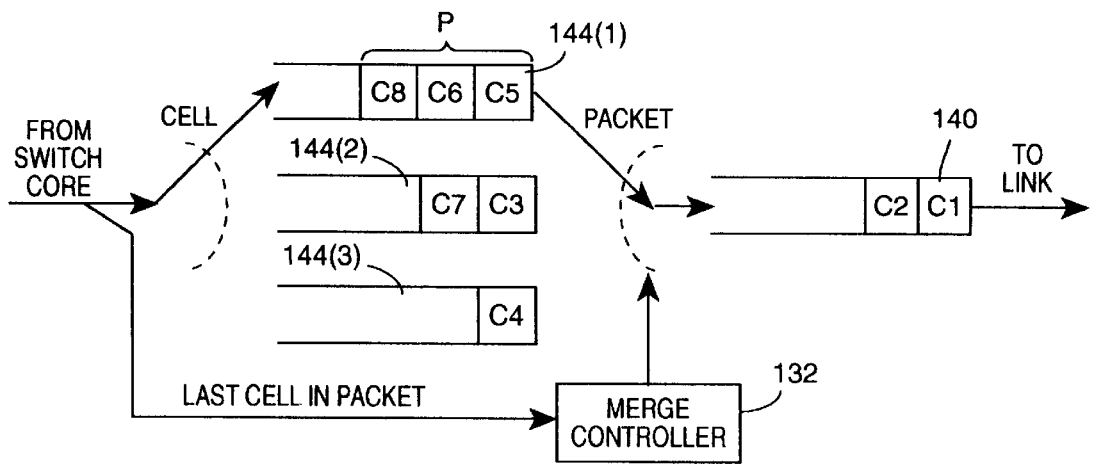
Figure 5E:
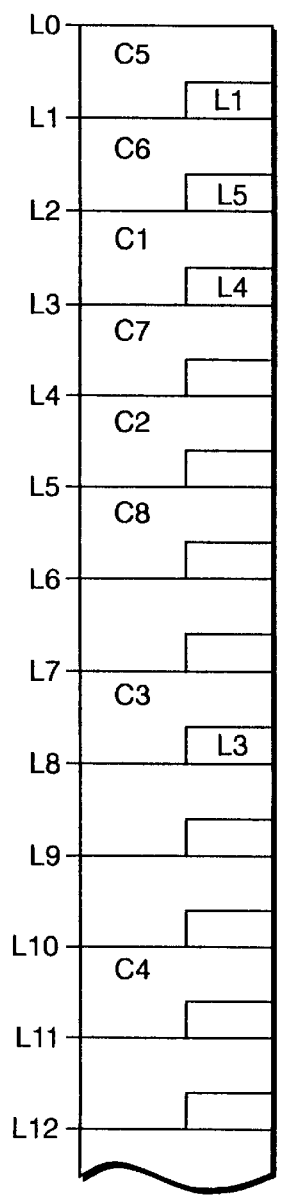

FIG. 4E and FIG. 5E show reception and storage in pre-merge VC queue 144 (1) of a further cell C8. Cell C8 is stored in a next free location in memory 130, i.e., location L5. So that cell C8 is linked into pre-merge VC queue 144 (1), the "Next" pointer for cell C6 is loaded with the location of cell C8, i.e., location L5.

As also shown in FIG. 4E, it is determined by merge controller 132 that an entire packet P consisting of cells C5, C6, and C8 has been assembled in pre-merge VC queue 144 (1). Accordingly, as depicted by FIG. 4F and FIG. 5F, merge controller 132 links pre-merge VC queue 144 (1) to merge VC queue 140.

Figure 4F:
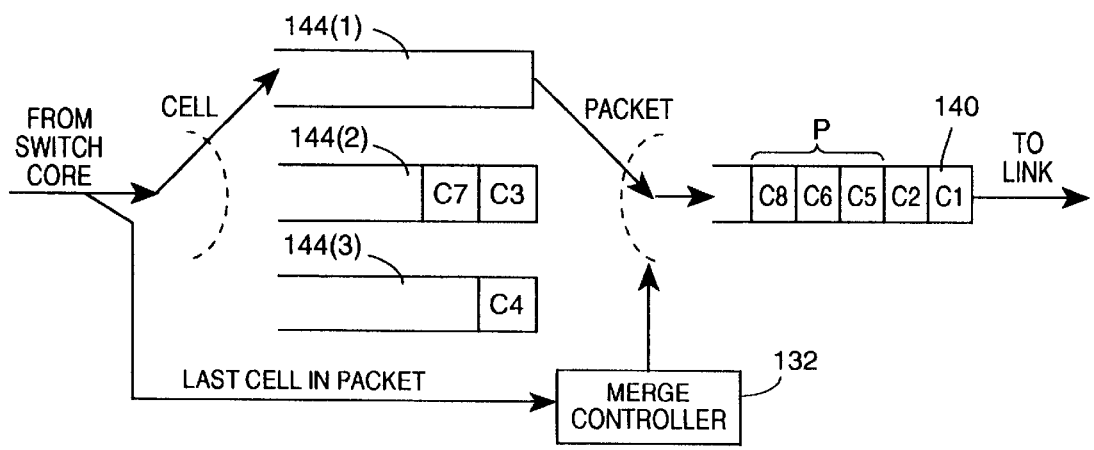
Figure 5F:
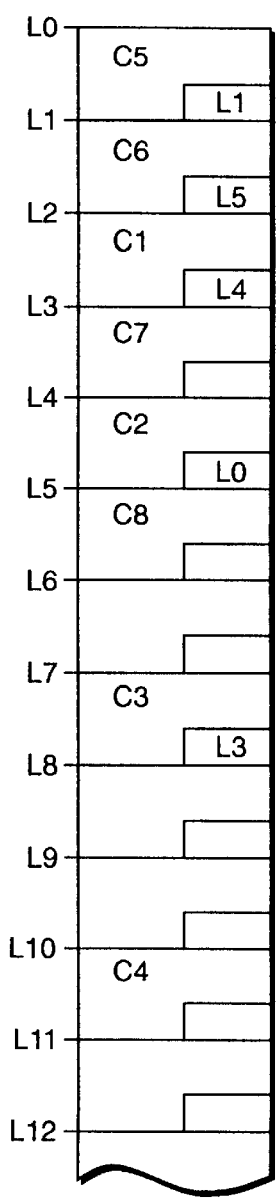

The linkage of pre-merge VC queue 144 (1) to merge VC queue 140 is shown in FIG. 4F by inclusion of cells C5, C6, and C8 in merge VC queue 140, and in FIG. 5F by e.g., loading the location of the first cell in queue 144 (1), i.e., location L0, into the "Next" pointer of what formerly was the last cell in queue 140, i.e., cell C2.

After the cells have been stored in the right one of the plurality of merge VC queues, e.g., VC merge queue 140 in the present illustration, a scheduler or selector may take one cell from each of the merge VC queues at a time (e.g., in round-robin fashion) and send the cells out onto an outgoing link. When doing so, a new VPI/VCI value is assigned to the cells, the same value being assigned for all cells from a particular merge VC queue. Alternatively, the new VPI/VCO value may be provided by the ingress port and already inserted in to the cell when it arrives at the egress port. When the cell has been sent out, the corresponding position in memory 130 is returned to the idle queue, i.e., setting the Next pointer of the previously last cell in the idle queue to point to it.

In accordance with the present invention, cell arriving from switch core 112 is put into an appropriate one of the plurality of pre-merge VC queues 144 based on its incoming internal channel number (VC). When the last cell of a packet has been received in a pre-merge VC queue 144, as indicated by a specified bit in the cell header, merge controller 132 moves the completed packet to merge VC queue 140 for output from egress port 116. There is one merge VC queue 140 for each outgoing channel, so that for any outgoing channel the cells are sent out in the order in which they are stored in the merge VC queue 140 for that channel, i.e., one complete packet at a time.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. An Asynchronous Transfer Mode (ATM) switching device comprising:
   a switch core connected to a plurality of incoming VC channels, the switch core receiving, on the plurality of incoming VC channels, cells having a corresponding plurality of VC identifiers;
   an egress port connected to receive, from the switch core, cells having the corresponding plurality of VC identifiers and which are applied to a same outgoing VC channel, the egress port comprising:
      a plurality of pre-merge VC queues into which cells received from the switch core are stored in accordance with their incoming VC channel;
      a merge VC queue associated with the outgoing VC channel;
      a merge controller which determines when one of the pre-merge VC queues has a completed packet of cells therein and enters the packet of cells into the merge VC queue so that completed packets of cells in the plurality of pre-merge VC queues are merged into a single outgoing link connected to the merge VC queue, whereby all cells entered into the merge VC queue are applied to the single outgoing link.

2. The apparatus of claim 1, wherein the plurality of pre-merge VC queues and the merge VC queue are stored in a memory, wherein the merge VC queue comprises a merge linked list in the memory and a selected one of the plurality of pre-merge VC queues comprises a selected pre-merge linked list in the memory, and wherein the merge controller enters the packet of cells into the merge VC queue by linking the selected pre-merge linked list to the merge linked list in the memory.

3. A method of operating an Asynchronous Transfer Mode (ATM) switching device, the method comprising:
   applying incoming cells to a switch core from a plurality of incoming VC channels, the switch core receiving, on the plurality of incoming VC channels, cells having a corresponding plurality of VC identifiers;
   receiving, at an egress port connected to the switch core, cells having the corresponding plurality of VC identifiers and which are applied to a same outgoing VC channel, and at the egress port performing the steps of:
      storing the incoming cells in a plurality of pre-merge VC queues in accordance with their incoming VC channel;
      making a determination when one of the pre-merge VC queues has a completed packet of cells therein; and, in accordance with the determination,
      entering the packet of cells into a merge VC queue associated with the outgoing VC channel; and
      applying the completed packets of cells from the merge VC queue to a single outgoing link connected to the merge VC queue whereby all cells entered into the merge VC queue are applied to the single outgoing link.

4. The method of claim 3, further comprising:
   establishing the plurality of pre-merge VC queues and the merge VC queue in a memory;
   forming the merge VC queue as a merge linked list in the memory;
   forming a selected one of the plurality of pre-merge VC queues as a selected pre-merge linked list in the memory;
   entering the packet of cells into the merge VC queue by linking the selected pre-merge linked list to the merge linked list in the memory.

5. The apparatus of claim 1, wherein the cells received from the switch core are unicast cells.

6. The method of claim 3, wherein the cells received from the switch core are unicast cells.

7. An Asynchronous Transfer Mode (ATM) switching device comprising:
a switch core connected to a plurality of incoming VC channels;
an egress port connected to receive cells from the switch core, the egress port comprising:
a plurality of pre-merge VC queues into which cells received from the switch core are stored in accordance with their incoming VC channel;
at least first and second merge VC queues;
a merge controller which determines when one of the pre-merge VC queues has a completed packet of cells therein, and wherein said merge controller determines whether to enter the packet of cells in the first or second merge VC queue and thereafter enters the packet of cells into the appropriate one of the merge VC queues so that completed packets of cells in the plurality of pre-merge VC queues are merged into a single outgoing link connected to the appropriate merge VC queue.

8. The apparatus of claim 7, wherein the plurality of pre-merge VC queues and the merge VC queues are stored in a memory, wherein each merge VC queue comprises a merge linked list in the memory and a selected one of the plurality of pre-merge VC queues comprises a selected pre-merge linked list in the memory, and wherein the merge controller enters the packet of cells into the appropriate merge VC queue by linking the selected pre-merge linked list to the merge linked list in the memory.

9. The apparatus of claim 7, wherein the cells received from the switch core are unicast cells.

10. The apparatus of claim 7, wherein cells output from said first merge VC queue are output on a first outgoing link and include a first VC identifier, and cells output from said second merge VC queue are output on a second outgoing link and include a second VC identifier.

11. The apparatus of claim 7, wherein cells output from said first merge VC queue are output on a first link so as to be directed toward another node via a first VC, and cells output from said second merge VC queue are output on a second link so as to be directed toward another node via a second VC.

12. A method of operating an Asynchronous Transfer Mode (ATM) switching device, the method comprising:
applying incoming cells to a switch core from a plurality of incoming VC channels;
at an egress port connected to receive cells from the switch core:
storing the incoming cells into a plurality of pre-merge VC queues in accordance with their incoming VC channel;
providing first and second merge VC queues in the egress port;
making a determination when one of the pre-merge VC queues has a completed packet of cells therein;
determining whether to enter the packet of cells in the first merge VC queue or the second merge VC queue;
entering the packet of cells into the first merge VC queue based upon said determining step; and
applying the completed packets of cells from the first merge VC queue to a single outgoing link connected to the first merge VC queue.

13. The method of claim 12, further comprising:
establishing the plurality of pre-merge VC queues and the merge VC queues in a memory;
forming each of the merge VC queues as a merge linked list in the memory;
forming a selected one of the plurality of pre-merge VC queues as a selected pre-merge linked list in the memory;
entering the packet of cells into the first merge VC queue by linking the selected pre-merge linked list to the corresponding merge linked list in the memory.

14. The method of claim 12, wherein the cells received from the switch core are unicast cells.

15. The method of claim 12, wherein a first virtual circuit or channel identifier is assigned to cells output from the first merge VC queue and a different second virtual circuit or channel identifier is assigned to cells output from the second merge VC queue.

* * * * *